A. C. SMITH.

Cultivator.

No. 5,547. Reissued August 19, 1873.

Witnesses.

J. Donnally.

D. D. Kane Jr.

Inventor

A. C. Smith,

Chipman & Coomer

Attys

AM. PHOTO-LITHOGRAPHIC CO. N.Y. (OSBORNE'S PROCESS.)

UNITED STATES PATENT OFFICE

ARTHUR C. SMITH, OF FAYETTEVILLE, NORTH CAROLINA.

IMPROVEMENT IN CULTIVATORS.

Specification forming part of Letters Patent No. 120,113, dated October 17, 1871; reissue No. 5,547, dated August 19, 1873; application filed July 12, 1873.

*To all whom it may concern:*

Be it known that I, ARTHUR C. SMITH, of Fayetteville, in the county of Cumberland and State of North Carolina, have invented certain new and useful Improvements in Cultivators; and I do hereby declare that the following is a full, clear, and exact description thereof, that will enable others skilled in the art to which it appertains to make and use the same, reference being had to the accompanying drawings and to the letters of reference marked thereon, which form a part of this specification.

The nature of my invention consists in the construction and arrangement of a cultivator, formed of a cotton-plow and two cultivator or ridge plows, including the devices for connecting and bracing the same together, all of which will be hereinafter more fully set forth.

Figure 1:
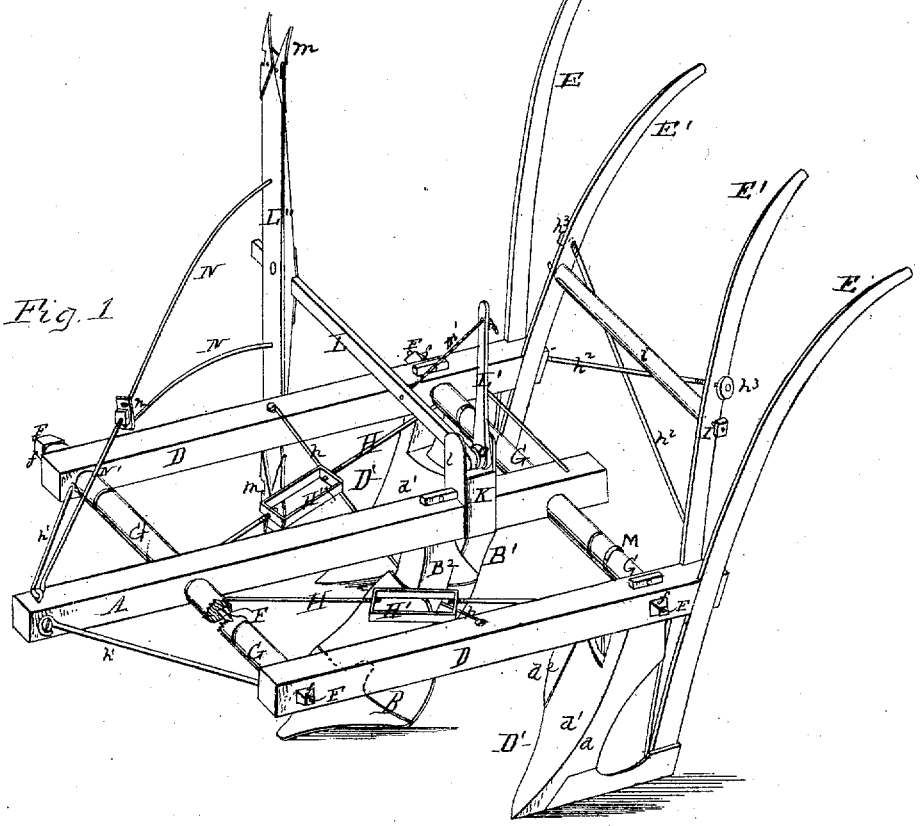
Figure 2:
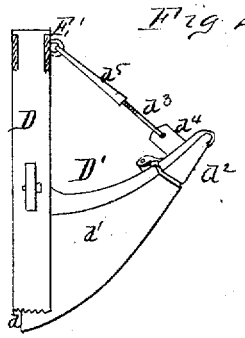

In the accompanying drawing, Figure 1 is a perspective view of the entire cultivator, and Fig. 2 is a plan view of one of the cultivator or ridge plows.

A represents the draft-beam of a cotton-plow, provided with a shovel, B, the point and breast being constructed separately, and being furnished, respectively, with corresponding projection and slot. The plow described in said application is constructed so as to be adaptable to this combination and others of a similar nature, and hence is subject to certain changes, involving the removal of the handles, the wings in the rear of the shovel, and the rear section of the standard, or that part designed to support the wings. When the cotton-plow, with the above-mentioned parts removed, is employed in the combination which I am now describing, a brace, $B^1$, is substituted for the rear section of the plow-standard, and is secured by bolts to the under side of the beam A, and to the base and upper part of the standard marked $B^2$. D D represent the draft-beams of the ridge or cultivator plows, with plows D′ D′, the land-sides of which are marked *d*, and the mold-boards $d^1$. Each of these plow-beams D D is provided with handles E E′, secured to the rear ends of the beams, and to the base part of the land-side *d*. The three beams A and D D are coupled together chiefly by means of two transverse and parallel rods, F F, formed with screw-threads on their ends, and nuts *f f* are placed thereon on the outer sides of the beams D D.

On the rods F F, between the beams, are placed sleeves or tubes G G, which are designed for the purpose of regulating the width apart of the beams, and their length and number are adapted to the use to which they are applied accordingly. Diagonally within the spaces between the middle beam A and the side beams D D are arranged braces H H for coupling the front and rear rods F F, as shown. Each of these braces is made in two sections, which are coupled together by means of a shackle, H′, swiveled to one of the sections and screwed onto the other, by which means the braces are rendered adjustable to suit the width of the implement. From the cotton-plow standard, braces *h h* run obliquely to the beams D D, and other brace-rods, $h^1$ $h^1$, reach from the forward end of the beam A to the beams D D. From the rear end of each side beam D, a brace-rod, $h^2$, extends in an oblique direction to and through the handle E′ of the plow on the other side, and ends of the said brace-rods formed with screw-threads to receive adjusting-nuts $h^3$ $h^3$. The handles E′ E′ are further coupled together by means of a rod, I, provided between the handles with a tube or sleeve, *i*, adapted in length to the distance apart of these handles. By means of the adjustable rods and braces, as described, the beams D D may be adjusted to different angles with reference to the position of the beam A. K is a stirrup secured to the beam A, and supporting the inner end of a marker-arm, L, which is pivoted to a shaft or pin, *l*. L″ represents the marker, designed to mark out the position of the ridges, which are afterward formed. It is located on the outer end of the arm L, which passes through a slot or mortise in said arm, and allows the latter to be moved for adjustment. N N represent two arms secured to the face of the marker, and run from thence to a plate, *n*, to which, also, is secured a rod, N′, reaching from the forward end of the beam A, to which it is hinged. The marker is armed at each end with a pair of marking-teeth, *m*, and is capable of being thrown from side to side of the implement. A cord, *m′*, attached to the arm L, passes through a handle, L′, arranged as shown, with a stirrup, K. By drawing on the cord $m$, the marker is raised up out of the way, and, by a forcible swing, it may be thrown over from one side to the other of the implement. On the pin supporting the arm L and handle L′ is a washer, O, to keep the two apart. The ridge-plows have hinged to each mold-board a wing, $d^2$, which may be thrown forward or backward to suit the nature of the ridge being formed, or other circumstances. A rod, $d^3$, is hooked to an ear, $d^4$, projecting from the back part of each wing, and thence coupled to the handle E′ nearest it by means of a shackle, $d^5$. This rod and shackle enable the wing to be held at any position to which it may be adjusted. M are rods hung upon the rods F, and designed to aid in supporting and keeping rigid the plows D′.

Having thus fully described my invention, what I claim as new, and desire to secure by Letters Patent, is—

1. In combination with the plow-beams D D and their handles E′ E′, connected by rod I with sleeve $i$, the diagonal braces $h^2$ $h^2$, passing from the rear ends of the plow-beams to and through the handle of the plow on the other side, and adjusted by nuts $h^3$ $h^3$, substantially as and for the purposes herein set forth.

2. The combination of the land-marker L″, adapted to slide along the pivoted arm L, and rendered adjustable by means of the arms N N and adjusting-plate $n$, with the stirrup K, cord $m$, and post L′, all arranged and operating as described.

In testimony that I claim the foregoing I have hereunto set my hand.

ARTHUR C. SMITH.

Witnesses:

I. A. BROWN,

WM. M. S. M. KAY.